United States Patent [19]
Calcagno et al.

[11] 3,862,216
[45] Jan. 21, 1975

[54] PROCESS FOR PREPARING VINYL ACETATE

[75] Inventors: Benedetto Calcagno, Milan; Claudio Divo, Saronno; Marcello Ghirga, Bresso, all of Italy

[73] Assignee: Societa italiana S.p.A., Milan, Italy

[22] Filed: July 15, 1969

[21] Appl. No.: 842,029

[30] Foreign Application Priority Data
July 22, 1968 Italy .................................. 19273/68

[52] U.S. Cl. .................................. 260/497 A
[51] Int. Cl. .................................. C07c 67/04
[58] Field of Search .................... 260/497 A, 533 R

[56] References Cited
UNITED STATES PATENTS

| | | | |
|---|---|---|---|
| 3,240,805 | 3/1966 | Naglieri | 260/533 R |
| 3,277,158 | 10/1966 | Schaeffer | 260/497 A |

*Primary Examiner*—Lorraine A. Weinberger
*Assistant Examiner*—Richard D. Kelly
*Attorney, Agent, or Firm*—Sughrue, Rothwell, Mion, Zinn & MacPeak

[57] ABSTRACT

Vinyl acetate is prepared by a conventional process of passing ethylene and oxygen through an acetic acid solution or suspension of a catalyst, and recycling gases including unreacted ethylene; however, a fraction of the gases to be recycled is separated off, admixed with oxygen or an oxygen-containing gas, and the mixture is subjected to catalytic oxidation to oxidize the ethylene present to acetic acid, which is supplied to the reactor wherein the vinyl acetate is formed, the recycle gases being treated under conditions such that the content of by-products in the recycled gases is kept below 20 percent by volume, and the amount of acetic acid formed is sufficient to replace the acetic acid consumed in the preparation of the vinyl acetate.

14 Claims, No Drawings

PROCESS FOR PREPARING VINYL ACETATE

BACKGROUND OF THE INVENTION

The invention relates to a process for preparing vinyl acetate from ethylene.

It is known that vinyl acetate may be prepared by catalytically oxidising ethylene in the presence of acetic acid. The operation is normally carried out at high temperature and pressure by supplying ethylene and oxygen or oxygen-containing gases to a reactor containing a catalyst comprising palladium and copper salts, and alkali or alkaline earth metal acetates or halides, the salts being dissolved and/or suspended in acetic acid.

However, this process is expensive on account of the use of an expensive reagent, namely acetic acid. Moreover, only part of the ethylene is converted during its passage through the acetic acid and hence the reaction gases, after separation of the vinyl acetate product, are recycled so as to re-use the unreacted ethylene. However, by-products are also formed in the reaction, especially carbon dioxide and halogenated products, and it is necessary to prevent accumulations of these by-products in the recycled gases. It is therefore customary to discard part of the recycled gases, which results in appreciable losses of ethylene, or else to remove the by-products by a purification process; however, known purification processes are tedious and costly.

SUMMARY OF THE INVENTION

The invention provides a process for preparing vinyl acetate by catalytic oxidation of ethylene in the presence of acetic acid, which avoids the accumulation of impurities in the recycled gases and at the same time supplies the necessary acetic acid for preparing the vinyl acetate.

The process of the invention is essentially characterized by the steps of drawing a convenient fraction of the recycled gases from the reactor in which the vinyl acetate is formed, catalytically oxidising the ethylene contained in said fraction to acetic acid with the aid of gaseous oxygen and supplying the acetic acid formed to the reactor in which the vinyl acetate is formed, the conditions being such that the content of by-products in the recycled gases is kept below 20 percent by volume, and the amount of acetic acid formed is sufficient to replace the acetic acid consumed in the preparation of the vinyl acetate.

This avoids the above described drawbacks of the processes of the prior art and advantageously provides, from waste gas, the necessary acetic acid for the process.

DESCRIPTION OF THE PREFERRED EMBODIMENTS

The process of the invention is suitably carried out as follows.

Oxygen and ethylene are caused to flow in a first reactor through a solution of acetic acid in which a palladium salt, an oxidising-reducing system, and reaction promoters if desired are dissolved and/or suspended.

After separation of the condensable products, including vinyl acetate a fraction of the gases issuing from the first reactor is drawn off and supplied to a second reactor in which the ethylene therein is catalytically oxidised to acetic acid by means of an oxygen-containing gas.

The gaseous fraction drawn off, preferably less than 10 percent by volume of the recycled gas, is large enough to avoid the accumulation of by-products in the recycled gas to the acetate vinyl reactor, the by-products being maintained at values below 20 percent by volume, and to simultaneously supply the quantity of acetic acid consumed by the reaction.

The resulting acetic acid is separated from the gaseous mixture and conveyed to the vinyl acetate reactor, to which the fraction of the recycled gases is also supplied, which has not been subjected to the oxidation treatment for forming acetic acid.

The ethylene and oxygen feed may be supplied separately or mixed together; the ethylene/oxygen volume ratio is preferably 9 : 1 to 21 : 1, preferably 14 : 1 to 18 : 1. Commercial ethylene of over 99 percent purity is generally employed, and the oxygen is preferably over 95 percent pure.

The acetic acid solutions contain a palladium salt, preferably the chloride, of a concentration of 0.0005 to 0.05 mols/liter, a copper salt, preferably the chloride, of a concentration of 0.05 to 0.75 mols/liter, an alkali or alkaline earth metal acetate, preferably lithium acetate, of a concentration of 0.6 to 1.8 mols/liter. Reaction promoters may also be included, such as palladium salts, which are employed in concentrations of 0.001 to 0.1 mols/liter.

The vinyl acetate forming reaction is suitably carried out at a temperature of 50° to 200°C, preferably 80° to 160°C, still more preferably 100° to 140°C, at a pressure of 1 to 80 atm, preferably 20 to 50 atm.

In the second reactor, wherein the ethylene is oxidised to acetic acid, the fraction of the recycled gas from the second (vinyl acetate forming) reactor is caused to flow over suitable supported oxidation catalysts, preferably metals of Group VIII of the Periodic Table. Preferably, the catalysts contain reaction promoters. In the second reactor the pressure may range within wide limits, such as 1 to 40 atm, and is preferably maintained at the same values as in the first reactor, and the temperature is 150° to 300°C, preferably 200° to 250°C.

The recycled gas is admixed with an oxygen containing gas, usually air, in a quantity such that the oxygen : ethylene ratio is 20 : 1 to 2.5 : 1, preferably 10 : 1 to 5 : 1, and the content of oxygen and ethylene together does not exceed 20 percent by volume of the reactant gases, the remainder comprising inert gases.

The gases issuing from the second reactor are cooled in order to condense out the acetic acid, which is supplied to the first reactor. In order to maintain the desired content of oxygen and inert gases, part of the gases is recycled to the oxidation reactor forming acetic acid, the remainder being withdrawn.

The following example illustrates the invention.

EXAMPLE

In a pilot plant a reactor of 10 liters capacity containing 7,000 ml acetic acid, 3.58 g palladium di-chloride, 260 g copper chloride, 142 g lithium acetate and 24g vanadium pentoxide, was charged with approximately 1.2 cu.m./hour of ethylene, 0.35 cu.m/hour oxygen and 21.4 cu.m/hour recycled gas of the volumetric composition: ethylene 88.6 percent, carbon dioxide 7.8 percent and oxygen 3.6 percent.

The operation was carried out under substantially anhydrous conditions. The operating pressure was maintained at 30 atm and the reaction temperature at 130°C. Approximately 2 molar percent of ethylene was converted to vinyl acetate on each passage, the ethylene selectivity amounting to about 80 percent. Moreover, small acetaldehyde quantities were obtained.

After separating the normally liquid products, including vinyl acetate, about 3.5 percent by volume was drawn off from the gases issuing from the vinyl acetate forming reactor and conveyed to a second acetic acid forming reactor. The remainder of the gas was recycled directly to the vinyl acetate forming reactor.

The withdrawn 3.5 percent fraction of gas was passed through the second reactor together with approximately 8.5 cu.m/hour of air, 6.8 cu.m/hour steam and 52 cm.m/hour recycle gas obtained after separation of the acetic acid. This latter reactor contained a catalyst comprising 0.7 percent by weight palladium dichloride and 8.4 percent by weight vanadium pentoxide supported on alumina. The operating pressure was maintained at 30 atm, the reaction temperature at 210°C and the spatial velocity at approximately 200 liters/-liter/hour.

The acetic acid separated from the issuing gases was conveyed to the vinyl acetate forming reactor in a quantity amounting to approximately 1,100 g/hour; approximately 13 percent by volume of the gas was withdrawn, and the remainder was recycled to the acetic acid forming reactor.

What is claimed is:

1. In a process for preparing vinyl acetate which comprises:

a. supplying ethylene and gaseous oxygen or an oxygen-containing gas to a reactor containing a solution or suspension of a catalyst of palladium and copper and an acetate or halide of a member selected from the group consisting of an alkali and alkaline earth metal, b. separating the condensible products of the reaction including vinyl acetate, and c. recycling the remaining gaseous products including any unreacted ethylene, the improvement which comprises;

1. drawing a fraction of the recycled gases from the production reactor for vinyl acetate, said fraction constituting less than 10 percent by volume of the gases to be recycled,
2. Oxidizing the ethylene contained in said fraction to acetic acid through the employment of oxygen or oxygen-containing gases in the presence of a supported oxidation catalyst selected from the group VIII of the Periodic Table, the oxygen/ethylene ratio, by volume, ranging from 20:1 to 2.5:1 and the total oxygen and ethylene content not exceeding 20 percent by volume, the balance being inert gases, and
3. feeding said acetic acid to the vinyl acetate production reactor in order that the side product content in the recycled gases remains below 20 percent by volume, the amount of acetic acid necessary for vinyl acetate production being simultaneously formed.

2. The process of claim 1, wherein the separated gaseous fraction is oxidized at a temperature from 150° C to 300° C.

3. The process of claim 2, wherein said temperature ranges from 200° C to 250° C.

4. The process of claim 1, wherein said oxidation is carried out at a pressure of from 1 to 40 atmospheres.

5. The process of claim 1, wherein the inlet gases to the vinyl acetate forming reactor have an ethylene/oxygen volume ratio of from 9:1 to 21:1.

6. The process of claim 1, wherein the inlet gases to the vinyl acetate forming reactor have an ethylene/oxygen volume ratio of from 14:1 to 18:1.

7. The process of claim 1, wherein the catalytic system employed in preparing the vinyl acetate is a suspension and/or solution of acetic acid containing a palladium salt having a concentration of from 0.005 to 0.05 mols per liter, a copper salt having a concentration of from 0.05 to 0.75 mols per liter, and a member selected from the group consisting of an alkali and an alkaline earth metal acetate having a concentration of from 0.6 to 1.8 mols per liter.

8. The process of claim 1, wherein the vinyl acetate forming reaction is carried out at a temperature from 50° C to 200° C, and at a pressure of from 1 to 80 atmospheres.

9. The process of claim 8, wherein said temperature ranges from 80° C to 160° C.

10. The process of claim 8, wherein said temperature ranges from 100° C to 140° C.

11. The process of claim 8, wherein said pressure ranges from 20 to 50 atmospheres.

12. The process of claim 1, wherein said promoter is a palladium salt.

13. The process of claim 1, wherein said oxygen-/ethylene ratio, by volume, ranges from 10:1 to 5:1.

14. In a process for preparing vinyl acetate which comprises:

a. supplying ethylene and gaseous oxygen or an oxygen-containing gasa to a reactor containing a solution or suspension of a member selected from the group consisting of a palladium and copper catalyst and an acetate or halide of a member selected from the group consisting of an alkali and alkaline earth metal, b. separating the condensible products of the reaction including vinyl acetate, and c. recycling the remaining gaseous products including any unreacted ethylene, the improvement which comprises;

1. drawing a fraction of the recycled gases from the production reactor for vinyl acetate, said fraction constituting less than 10 percent by volume of the gases to be recycled,
2. Oxidizing the ethylene contained in said fraction to acetic acid through the employment of oxygen or oxygen-containing gases in the presence of a supported oxidation catalyst selected from the group VIII of the Periodic Table, the oxygen-/ethylene ratio, by volume, ranging from 20:1 to 2.5:1 and the total oxygen and ethylene content not exceeding 20 percent by volume, the balance being inert gases, and
3. feeding said acetic acid to the vinyl acetate production reactor in order that the side product content in the recycled gases remains below 20 percent by volume, the amount of acetic acid necessary for vinyl acetate production being simultaneously formed, said reaction being carried out at a temperature of from 100° C to 140° C and at a pressure of from 20 to 50 atmospheres, the separated gaseous fraction being oxidized at a temperature of from 200° C to 250° C, and at a pressure of from 1 to 40 atmospheres, and the oxygen-/ethylene ratio, by volume, ranging from 10:1 to 5:1.

* * * * *